July 2, 1968  W. H. PRICE  3,390,936

FOUR-COMPONENT PHOTOGRAPHIC OBJECTIVE

Filed Nov. 2, 1964

WILLIAM H. PRICE
INVENTOR.

BY
ATTORNEYS

United States Patent Office 3,390,936
Patented July 2, 1968

---

3,390,936
FOUR-COMPONENT PHOTOGRAPHIC OBJECTIVE
William H. Price, Rochester, N.Y., assignor to Eastman Kodak Company, Rochester, N.Y., a corporation of New Jersey
Filed Nov. 2, 1964, Ser. No. 408,025
2 Claims. (Cl. 350—210)

---

ABSTRACT OF THE DISCLOSURE

A photographic objective is disclosed having four air-spaced components with the diaphragm in the third air space from the front. The objective comprises, from front to rear, a first simple positive meniscus component, a second simple positive meniscus component, a simple negative meniscus component and a positive meniscus doublet, all meniscus components being concave to the diaphragm.

---

This invention relates to photographic objectives which are highly corrected over a wide field at a high aperture. More specifically, this invention relates to 4-component photographic objectives of a well-known type in which the third component is negative, the other 3 components are positive and the second component is meniscus convex to the front.

The more complex photographic objectives of this type generally contain six or more elements with the second and fourth components doublets or the fourth component a triplet, see for example, U.S. 2,336,300, Schade; U.S. 2,164,028, Berek; and U.S. 2,449,769, Cox. Although these objectives have high corrections, the number and thickness of the elements make them costly.

I have found that the first two elements of a lens of the type shown in said Schade patent can be combined into one element of intermediate power by using glass with an intermediate dispersive index, that is, a V number between 42 and 52. This combination, together with adjustments in the choice of glass in the rear component, the use of high index glass in the first three components, that is, greater than 1.67, and a bending of most surfaces more concave to the diaphragm have allowed me, contrary to expectations, to provide a lens of only five elements which has better corrections than prior 6-element systems.

I further found that the sum of the thicknesses of the elements could be substantially reduced by placing the cemented surface of the rear doublet as close to the rear of such doublet as possible. More specifically, the thickness of the first element of such component should be greater than .05 times the focal length of the objective and the thickness of the rear element of such component should be less than .10 times the focal length of the objective. In both examples shown below, the axial thickness of the first element of the doublet is larger than the axial thickness of the second element of such doublet.

I have thus provided a lens which is comparable in performance to, and considerably less expensive than, lenses with triplets in the rear.

Figure 1:
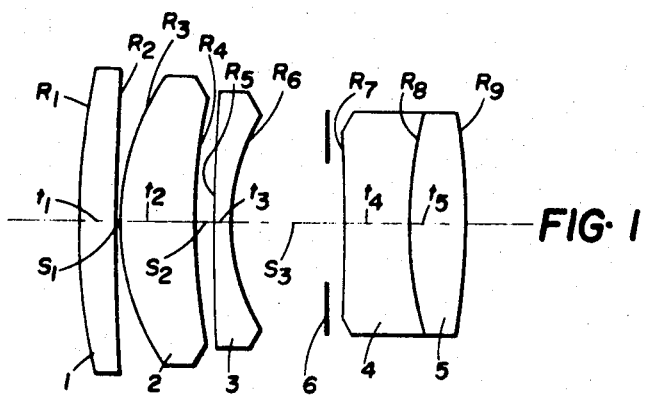
Figure 2:
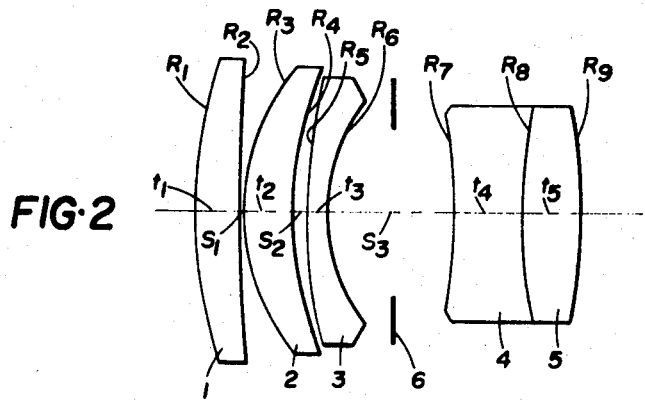

In the accompanying drawings, FIGS. 1 and 2 are diagrammatic axial sections of two embodiments of the invention.

According to FIGS. 1 and 2, from front to rear, the elements are numbered from 1 to 5, the radii from $R_1$ to $R_9$, the axial thicknesses from $t_1$ to $t_5$ and the airspacings from $S_1$ to $S_3$. The diaphragm 6 is in the third airspace.

In the first embodiment shown in FIG. 1, all elements are made slightly meniscus concave to the diaphragm.

With this arrangement, high corrections can be obtained by using a rear doublet which has a positive rear element which is slightly more dispersive than the negative front element. According to this embodiment, best results are obtained within the following ranges:

$.80F < R_1 < .95F$
$1.0F < R_2 < \infty$
$.25F < R_3 < .35F$
$.65F < R_4 < .80F$
$1.0F < R_5 < \infty$
$.20 < R_6 < .30F$
$1.0F < -R_7 < \infty$
$.25F < R_8 < .75F$
$.70F < -R_9 < \infty$
$.03F < t_1 < .07F$
$.06F < t_2 < .2F$
$.01F < t_3 < .05F$
$.05F < t_4 < .12F$
$.04F < t_5 < .1F$
$t_4 + t_5 < .2F$
$0 < S_1 < .02F$
$.01F < S_2 < .05F$
$.10F < S_3 < .20F$
$1.67 < N_1, N_2, N_3 < 1.85$
$1.48 < N_4 < 1.54$
$1.66 < N_5 < 1.73$
$42 < V_1 < 52$
$42 < V_2 < 62$
$23 < V_3 < 36$
$57 < V_4 < 63$
$53 < V_5 < 59$ A preferred example of the embodiment according to FIG. 1 may be constructed according to the following data:

EXAMPLE 1

| Lens Element | N | V | Radius, mm. | Thickness or Separation, mm. |
|---|---|---|---|---|
| 1 | 1.745 | 46.4 | $R_1 = 86.3$ | $t_1 = 4.4$ |
|   |       |      | $R_2 = 268$  | $S_1 = .20$ |
| 2 | 1.734 | 51.0 | $R_3 = 29.4$ | $t_2 = 9.3$ |
|   |       |      | $R_4 = 71.5$ | $S_2 = 2.0$ |
| 3 | 1.720 | 29.3 | $R_5 = 145$  | $t_3 = 2.4$ |
|   |       |      | $R_6 = 23.5$ | $S_3 = 13.2$ |
| 4 | 1.513 | 60.5 | $R_7 = -214$ | $t_4 = 7.5$ |
| 5 | 1.697 | 56.2 | $R_8 = 47.8$ | $t_5 = 6.9$ |
|   |       |      | $R_9 = -81.5$ |  |

In the above example, the focal length is 100 mm. and the back focus is 66 mm. The diaphragm is placed in the third airspace preferably between 8 and 11 mm. from $R_6$ although the precise location is not critical.

In the second embodiment which is shown in FIG. 2, all components are bent more concave to the diaphragm than in the first embodiment. This has a tendency to introduce a slight amount of coma into the image at small angles, but permits about 10% greater field coverage. The coma can be partially corrected by altering the glass in the rear doublet, more specifically, by using a more dispersive glass in the negative fourth element. This lens is almost as well corrected as the first embodiment and is somewhat less expensive because the greater bendings have allowed me to reduce the total thickness of the elements. According to this embodiment, best results are obtained within the following ranges:

$$.50F<R_1<.65F$$
$$1.0F<R_2<\infty$$
$$.20F<R_3<.35F$$
$$.40F<R_4<.55F$$
$$.60F<R_5<.75F$$
$$.18F<R_6<.30F$$
$$.60F<-R_7<.75F$$
$$.3F<R_8<1.0F$$
$$.50F<-R_9<.65F$$
$$.03F<t_1<.07F$$
$$.03F<t_2<.15F$$
$$.01F<t_3<.05F$$
$$.07F<t_4<.1F$$
$$.06F<t_5<.09F$$
$$0<S_1<.02F$$
$$.01F<S_2<.05F$$
$$.10F<S_3<.20F$$
$$1.67<N_1,N_2,N_3<1.85$$
$$1.48<N_4<1.54$$
$$1.66<N_5<1.73$$
$$42<V_1<52$$
$$42<V_2<62$$
$$23<V_3<36$$
$$48<V_4<55$$
$$53<V_5<59$$

A preferred example of the embodiment according to FIG. 2 may be constructed according to the following data:

EXAMPLE 2

| Lens Element | N | V | Radius, mm. | Thickness or Separation, mm. |
|---|---|---|---|---|
| 1 | 1.745 | 46.4 | $R_1=57.5$ | $t_1=4.9$ |
|  |  |  | $R_2=206$ | $S_1=.20$ |
| 2 | 1.734 | 51.0 | $R_3=26.6$ | $t_2=5.7$ |
|  |  |  | $R_4=44.7$ | $S_2=1.1$ |
| 3 | 1.720 | 29.3 | $R_5=67.5$ | $t_3=2.5$ |
|  |  |  | $R_6=21.5$ | $S_3=15.2$ |
| 4 | 1.528 | 51.6 | $R_7=-67.8$ | $t_4=8.2$ |
|  |  |  | $R_8=63.5$ | $t_5=7.2$ |
| 5 | 1.697 | 56.2 | $R_9=-56.0$ |  |

In the above example, the focal length is 100 mm. and the back focus 70 mm. The diaphragm is placed in the third air space preferably between 8 and 11 mm. from $R_6$ although the precise location is not critical.

The invention has been described in considerable detail with particular reference to certain preferred embodiments thereof, but it will be understood that variations and modifications can be effected within the spirit and scope of the invention as described hereinabove and as defined in the appended claims.

I claim:

1. A photographic objective having a focal length of 100 mm., and having four air-spaced meniscus components with the diaphragm in the third air space from the front, comprising from front to rear a first simple positive meniscus element, a second simple positive meniscus element, a simple negative meniscus element and a positive meniscus doublet, all said meniscus components being concave to the diaphragm, the lens elements having substantially the following characteristics and spatial relations in which the lens elements are numbered from the front, N is the index of refraction for the D-line of the spectrum, V is the index of dispersion, R, T and S refer respectively to the radii of curvature of the surfaces, the axial thicknesses of the elements, and the axial spacings between the lens elements, numbered by subscript from front to rear:

| Lens Element | N | V | Radius, mm. | Thickness or Separation, mm. |
|---|---|---|---|---|
| 1 | 1.745 | 46.4 | $R_1=86.3$ | $t_1=4.4$ |
|  |  |  | $R_2=268$ | $S_1=.20$ |
| 2 | 1.734 | 51.0 | $R_3=29.4$ | $t_2=9.3$ |
|  |  |  | $R_4=71.5$ | $S_2=2.0$ |
| 3 | 1.720 | 29.3 | $R_5=145$ | $t_3=2.4$ |
|  |  |  | $R_6=23.5$ | $S_3=13.2$ |
| 4 | 1.513 | 60.5 | $R_7=-214$ | $t_4=7.5$ |
|  |  |  | $R_8=47.8$ | $t_5=6.9$ |
| 5 | 1.697 | 56.2 | $R_9=-81.5$ |  |

2. A photographic objective having a focal length of 100 mm., and having four air-spaced meniscus components with the diaphragm in the third air space from the front, comprising from front to rear a first simple positive meniscus element, a second simple positive meniscus element, a simple negative meniscus element and a positive meniscus doublet, all said meniscus components being concave to the diaphragm, the lens elements having substantially the following characteristics and spatial relations in which the lens elements are numbered from the front, N is the index of refraction for the D-line of the spectrum, V is the index of dispersion, R, T and S refer respectively to the radii of curvature of the surfaces, the axial thicknesses of the elements, and the axial spacings between the lens elements, numbered by subscript from front to rear:

| Lens Element | N | V | Radius, mm. | Thickness or Separation, mm. |
|---|---|---|---|---|
| 1 | 1.745 | 46.4 | $R_1=57.5$ | $t_1=4.9$ |
|  |  |  | $R_2=206$ | $S_1=.20$ |
| 2 | 1.734 | 51.0 | $R_3=26.6$ | $t_2=5.7$ |
|  |  |  | $R_4=44.7$ | $S_2=1.1$ |
| 3 | 1.720 | 29.3 | $R_5=67.5$ | $t_3=2.5$ |
|  |  |  | $R_6=21.5$ | $S_3=15.2$ |
| 4 | 1.528 | 51.6 | $R_7=-67.8$ | $t_4=8.2$ |
|  |  |  | $R_8=63.5$ | $t_5=7.2$ |
| 5 | 1.697 | 56.2 | $R_9=-56.0$ |  |

References Cited

UNITED STATES PATENTS 2,164,028  6/1939  Berek _____ 350—223
3,176,583  4/1965  Klein _____ 350—223

DAVID H. RUBIN, Primary Examiner.

JOHN K. CORBIN, Examiner.